United States Patent
Alvarado

(10) Patent No.: US 8,414,841 B2
(45) Date of Patent: Apr. 9, 2013

(54) SUSPENDED MASS TRANSFER AND REACTION TOWER

(76) Inventor: Carlos Alvarado, Fernandina Beach, FL (US)

( * ) Notice: Subject to any disclaimer, the term of this patent is extended or adjusted under 35 U.S.C. 154(b) by 444 days.

(21) Appl. No.: 12/850,519

(22) Filed: Aug. 4, 2010

(65) Prior Publication Data

US 2012/0034139 A1    Feb. 9, 2012

(51) Int. Cl.
*B01J 8/02*    (2006.01)
*F03B 11/02*    (2006.01)

(52) U.S. Cl.
USPC .................................. 422/211; 137/561 R

(58) Field of Classification Search .................. 422/211; 137/561 R
See application file for complete search history.

(56) References Cited

U.S. PATENT DOCUMENTS

| | | | |
|---|---|---|---|
| 2,988,222 A * | 6/1961 | Hagdahl | ...................... 210/350 |
| 4,199,906 A | 4/1980 | Jasch | |
| 4,219,420 A | 8/1980 | Muller | |
| 4,307,063 A | 12/1981 | O'Brien | |
| 4,411,780 A | 10/1983 | Suzuki | |
| 4,422,930 A | 12/1983 | Hatanaka | |
| 4,491,565 A | 1/1985 | Verachtert | |
| 4,844,795 A | 7/1989 | Halwani | |
| 4,964,987 A | 10/1990 | Johnson | |
| 5,085,766 A | 2/1992 | Born | |
| 5,104,525 A | 4/1992 | Roderick | |
| 5,395,517 A | 3/1995 | Varadi | |
| 5,622,630 A | 4/1997 | Romano | |
| 6,190,555 B1 | 2/2001 | Kondo | |
| 6,241,889 B1 | 6/2001 | Haley, III | |
| 6,881,340 B2 | 4/2005 | Haley, III | |
| 7,261,284 B2 | 8/2007 | Ermanno | |
| 7,374,733 B2 | 5/2008 | Taylor | |

FOREIGN PATENT DOCUMENTS

RU        2006714 C1 *    1/1994

* cited by examiner

*Primary Examiner* — Walter D Griffin
*Assistant Examiner* — Huy-Tram Nguyen
(74) *Attorney, Agent, or Firm* — Stephen E. Kelly; Rogers Towers, P.A.

(57) ABSTRACT

A suspended mass transfer and reaction tower system used for the scrubbing, stripping or chemical reaction between gases and liquids. The system comprises a top head having a suspension means, a bottom head, and a shell capable of retaining and supporting a suspended packing bundle. The shell is capable of securely and removably attaching to the top head and bottom head, thereby creating a single tower capable of being suspended by the suspension means in the top head. Various embodiments of the system can be adapted for the purposes of chemical vent scrubbing, absorption, odor abatement, gas-liquid chemical reactions, or similar processes. The tower can be operated in the classical counter current or concurrent flow modes, under pressure, or in a partial vacuum.

20 Claims, 21 Drawing Sheets

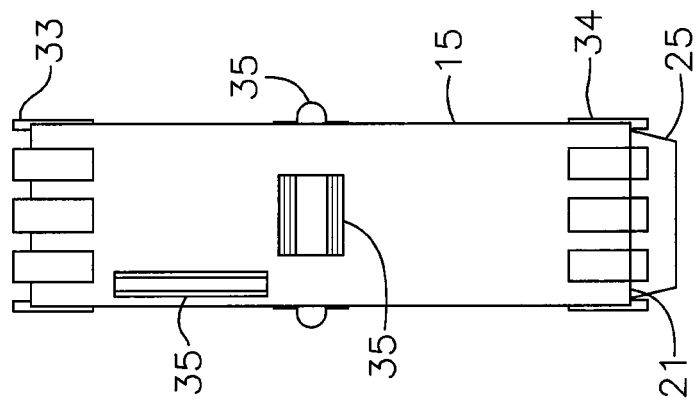
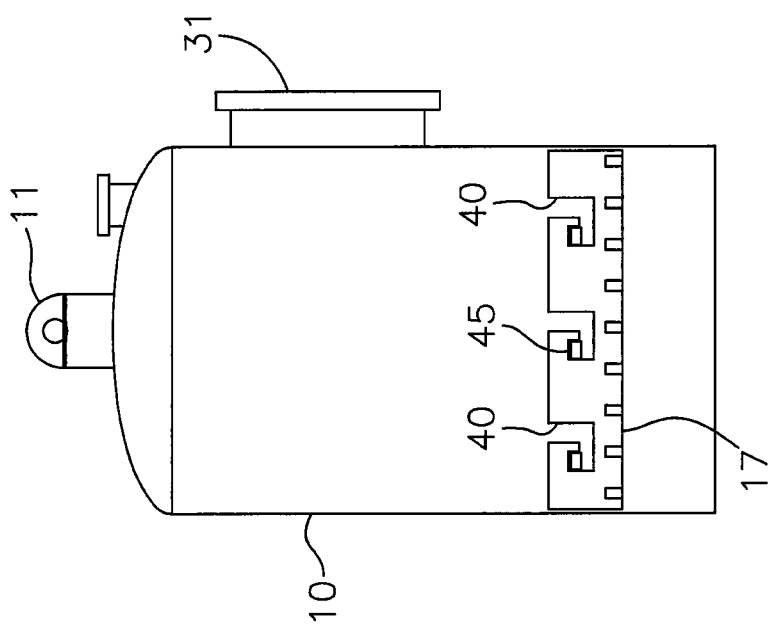
Fig. 10
Fig. 9

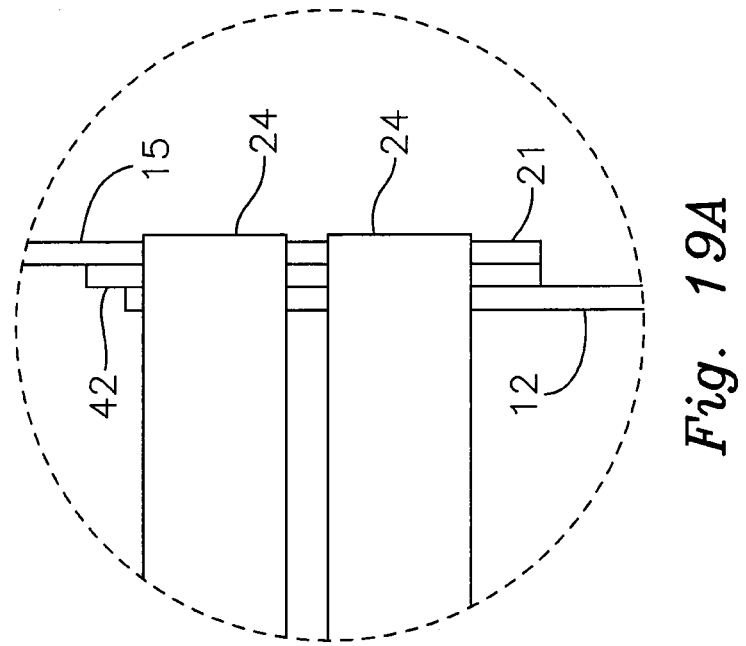
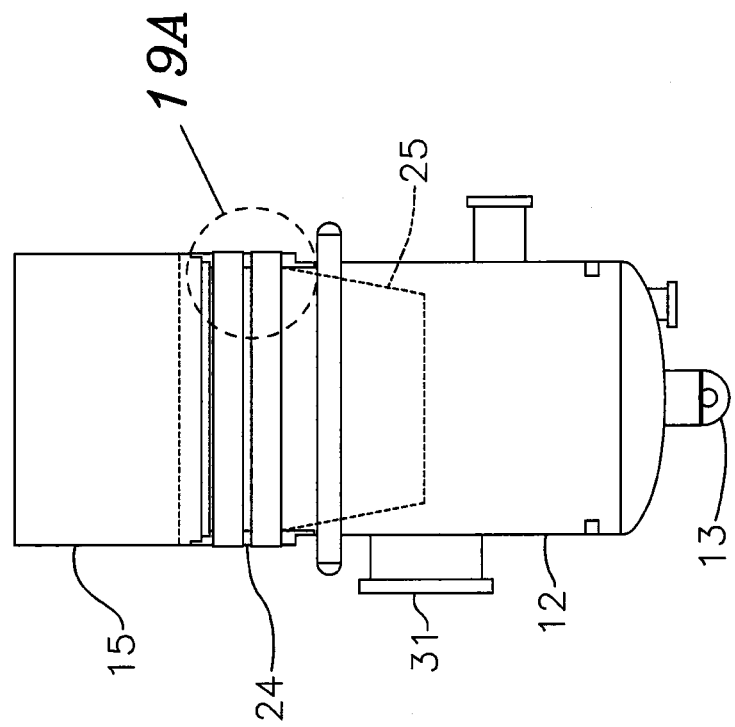

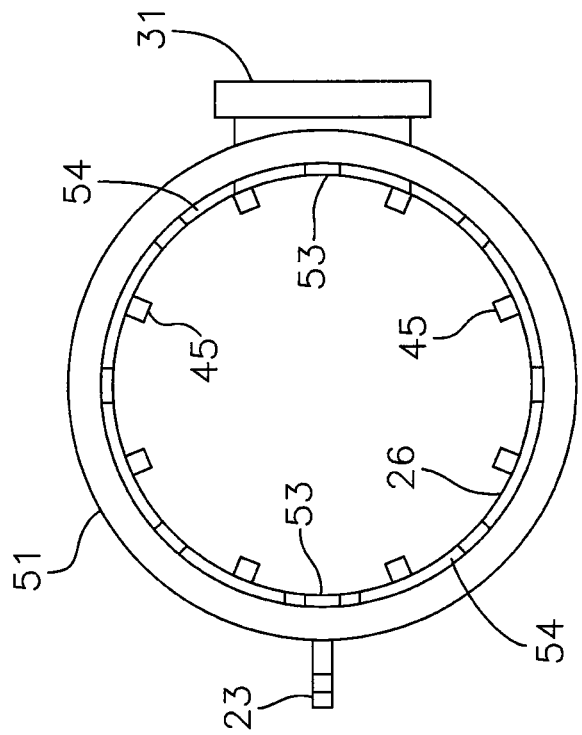
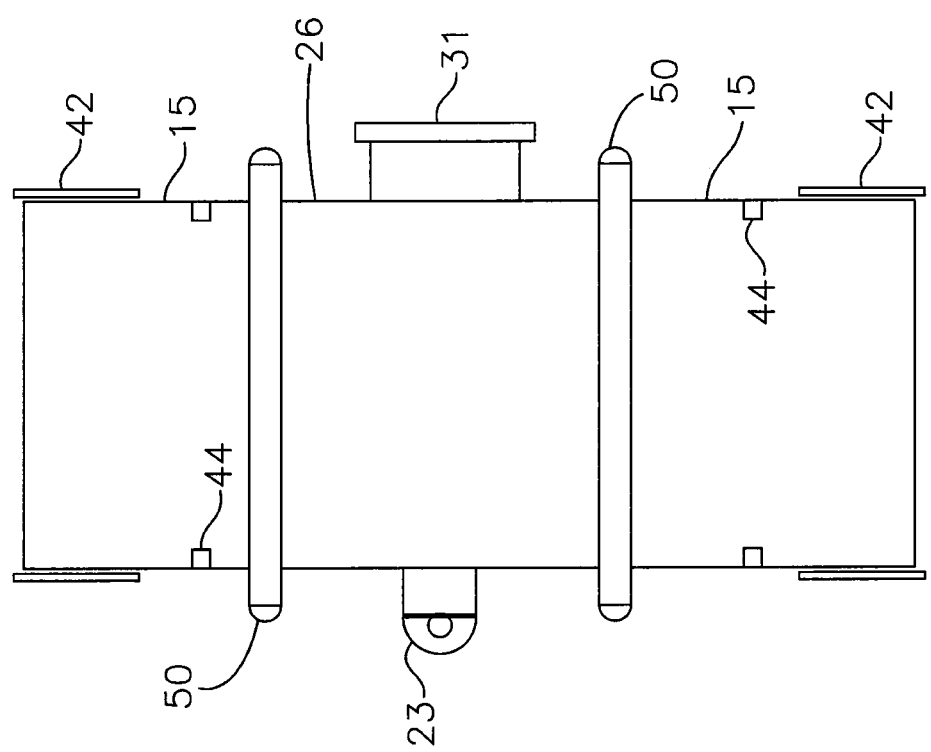

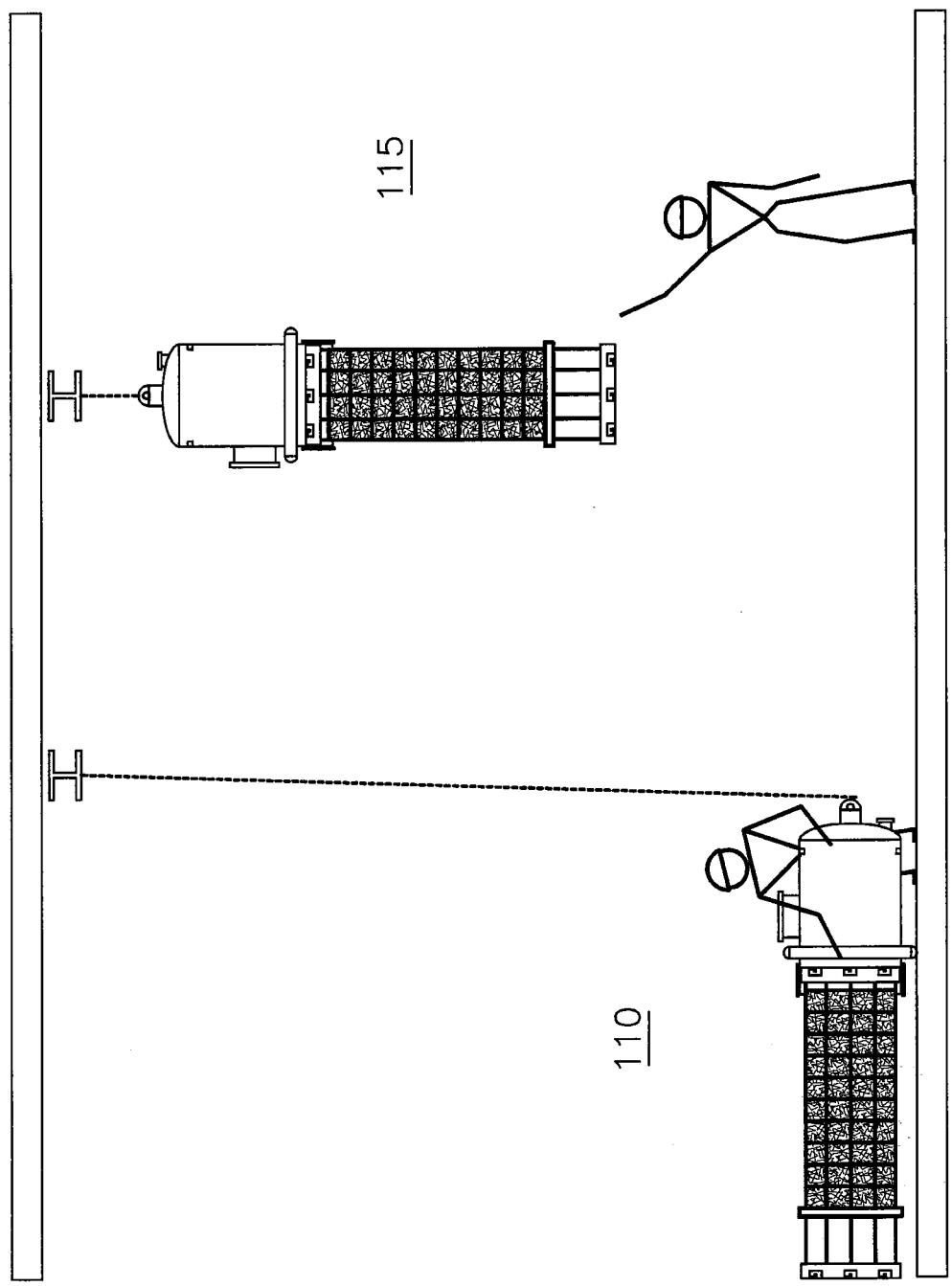

SUSPENDED MASS TRANSFER AND REACTION TOWER

BACKGROUND

Conventional mass transfer or chemical reaction packed towers (also known as columns) typically comprise a rigid shell, internal tower components and packing. Shells are constructed with materials such as metals, plastics, composites or other rigid materials. The internal tower components typically consist of miscellaneous process equipment such as liquid gas/distributors, packing supports, mist eliminators, spray nozzles, instruments and the like which are installed in or on the tower to facilitate process requirements such as the management of liquid and gas flows. The packing typically consists of either random or structured packing, separate or in combination, or trays (plates) known in the industry. Other external ancillary equipment such as fans, pumps, lines, tanks are connected to the tower to complement the process requirements. Conventional packed towers are supported by the shell bearing on the floor or from a structure designed for a similar purpose. The internals tower components and packing are typically supported at different locations from nozzles or from the inside of the tower's shell. Conventional towers are mostly permanently installed and not easily portable.

There is a need for a portable light weight tower system capable of being transported in a compact manner and installed at a variety of locations using equipment standard in the industry. The invention is directed at overcoming one or more of the problems by providing a lightweight, sectional, collapsible, portable tower capable of being installed in almost any industrial setting.

SUMMARY OF THE INVENTION

The system is a suspended tower, and components thereof. A suspended tower system according to principles of the invention permits mass transfer or chemical reactions within a system, that can be transported, set up, and operated in either countercurrent or concurrent flow formats in a variety of locations, conditions, and environments. The suspended tower allows typical mass transfer operations such as absorption or stripping. The system generally comprises a top head and a bottom head connected by a soft shell containing, suspended packing, wherein the entire system is suspended by a suspension means located on the top head. In various embodiments described below, the system can further comprise upper tension hubs, lower tension hubs, internal tower components, internal suspension lines and external suspension lines. Collectively, the top head, bottom head, the packing, and shell connect to form a suspended tower.

The top head provide structural support for the shell, suspended packing, tension hubs, and suspension lines. The top head is a rigid portion of the tower and is constructed of metal, plastic, composites or other rigid materials and it provides a location for the installation of internal tower components such as spray nozzles, liquid distributors, mist eliminators, packing bed limiters, instrumentation or the like. The top head houses the upper tension hub. The top head comprises a location for bracing and sealing the shell. Lateral lugs can be added for bracing the top head to reduce lateral movement. The design of the top head will vary depending of the demands of the process for which the system is designed.

The bottom head is a rigid portion of the tower constructed of metal, plastic, composites or other rigid materials. In most embodiments, the weight of the bottom head and its contents will provide the tensile requirements of the system for bracing and shaping the shell. The bottom head houses the lower tension hub. The bottom head affords a location for the installation of internal tower components, such as liquid and gas nozzles, instrumentation and the like. The bottom head comprise a location for bracing and sealing the shell. The bottom head comprises a receptacle to collect the liquid falling down the tower's liquid management system.

The upper tension hub and lower tension hub fit inside the top head and bottom head, respectively. The tension hubs are designed to provide a location for bracing the suspended packing and internal suspension lines. The tension hubs transfer the tensile force between the top and bottom heads. In one embodiment, the tension hubs are annular rigid rings having slots capable of mating with tension hub lugs located on the inside surface of the top head and bottom head, respectively. In other embodiment, the tension hubs may take different shapes depending of the design requirements. The design of the tension hubs can include a combination of functions in addition to bracing such as liquid/gas distribution, bed limiters, mist collectors or the like.

Generally, the shell is constructed of pliable or lightweight rigid materials allowing portability and ease of handling. The shell serves the functions of joining the top head and bottom head, containing the process gasses and liquids within the tower system, providing a space for the suspended packing bundle, supporting the packing in certain applications, and providing the flow shape of the tower. The shell has a means for a removable top attachment, which is any means for removably attaching the top of the shell to the top head or adjacent support, such as the support means on a connector head. The bottom of the shell comprises a means for a removable bottom attachment, which is any means for attaching the bottom of the shell to the bottom head or connector head. The shell may provide all, some or none of the weight bearing requirements of the tower.

The shape of the shell is maintained by stretching the shell material between the top head and bottom head. Under normal conditions, the shell is under tension induced by the weight of the bottom head, and the shell conforms to its natural catenary shape. In another embodiment, the shape of shell can be enhanced by the use of battens installed on the surface of the shell.

In order to form a leak-resistant seal between the shell and the bottom head, the shell comprises a liquid chute, which is an annular, tapered flap-like portion near the bottom of the shell. The chute directs the liquid flow away from the seal made by the bottom sealing cuff of the shell and the bottom head and channels the liquid into the bottom head.

The shell can be increased in length by connecting one or more shells together using the suspension connector heads. The connector heads comprise one or more connector tension hubs and provide connectivity for tower internal components and ancillary equipment. The connector heads comprise one or more shell support means as described above in the context of the heads. In the suspended tower having multiple shell segments, a connector head can be disposed between an upper shell segment and a lower shell segment. The upper segment attaches to a support means on the connector head via the bottom support means on the upper shell segment. The lower shell segment attaches to a support means on the connector head via the top attachment means on the lower shell segment. The attachments are made by similar methods and means as those described above in the context of attaching the shell to the heads.

The packing is suspended from the top head, from the shell, or a combination thereof. The suspended packing is used to provide a space for the intimate contact between the liquid

BRIEF DESCRIPTION OF THE DRAWINGS

FIG. 9 is a partial cross section view of a top head, showing the upper tension hub and the tension hub lugs.

FIG. 10 is an elevation view of a typical shell.

FIG. 19 is an elevation view of the bottom head showing the sealing bands securing the cuff of the shell and the liquid chute.

FIG. 19A is an enlarged view of a typical arrangement of a shell's sealing cuff, sealing gasket, bottom head and sealing bands.

FIG. 22 is an elevation view of a connection head.

FIG. 23 is a cross section view of a typical connection head.

FIG. 27 is an elevation view of the steps of attaching the suspended packing via the upper tension hub to the top head and raising the top head and suspended packing.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, or proportions shown in the figures.

DETAILED DESCRIPTION

Referring to the Figures, various embodiments of an exemplary suspended tower system, and components thereof, are shown. A suspended tower system according to principles of the invention permits mass transfer or chemical reactions between liquid and gases within a portable system that can be transported, set up permanently or temporarily, and operated in a variety of locations, conditions, and environments. The embodiments disclosed herein are meant for illustration and not limitation of the system. An ordinary practitioner will understand that it is possible to create other variations of the following embodiments without undue experimentation.

Figure 1:
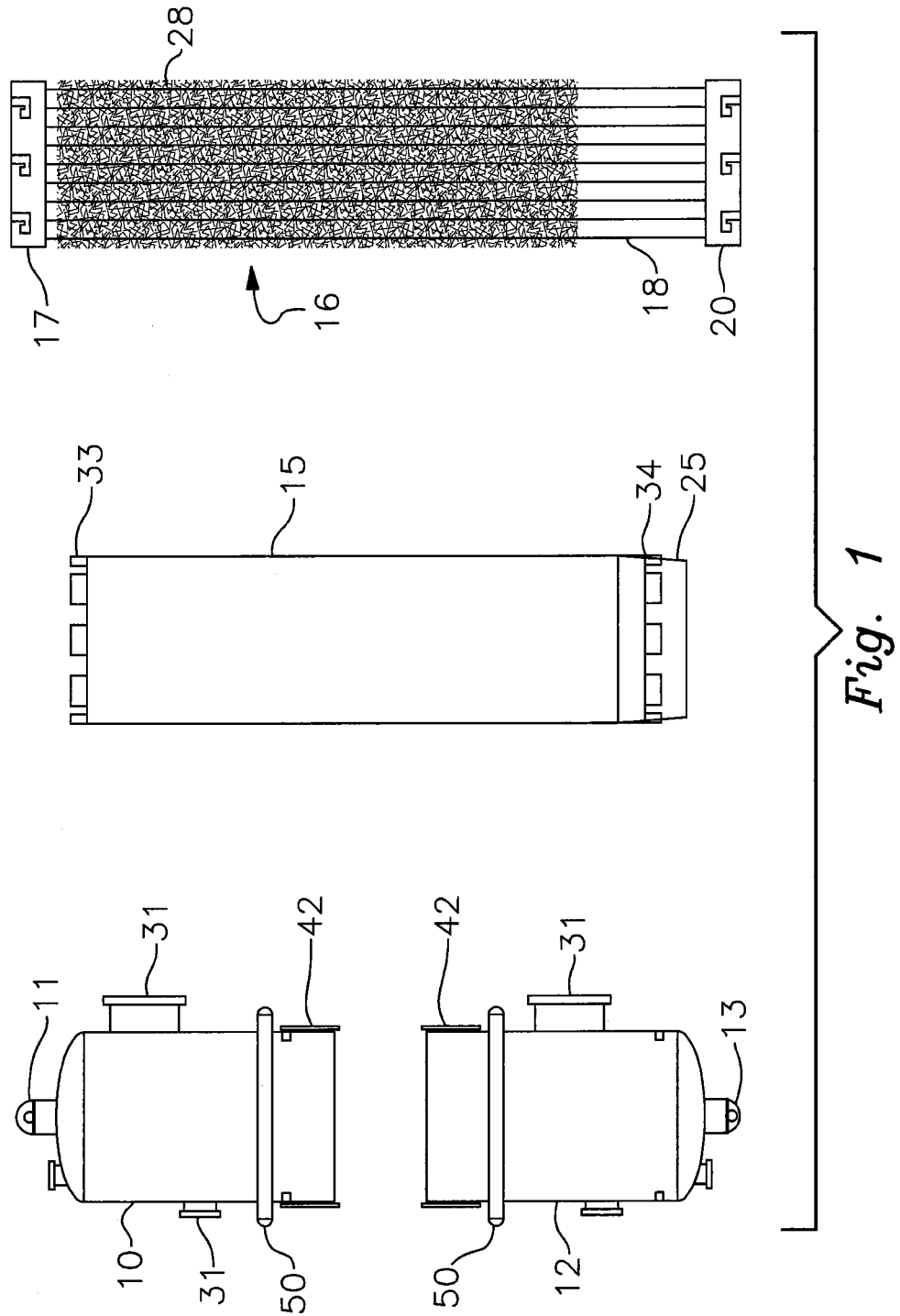
FIG. 1 shows an exploded view of the mass transfer tower system.
Figure 2:
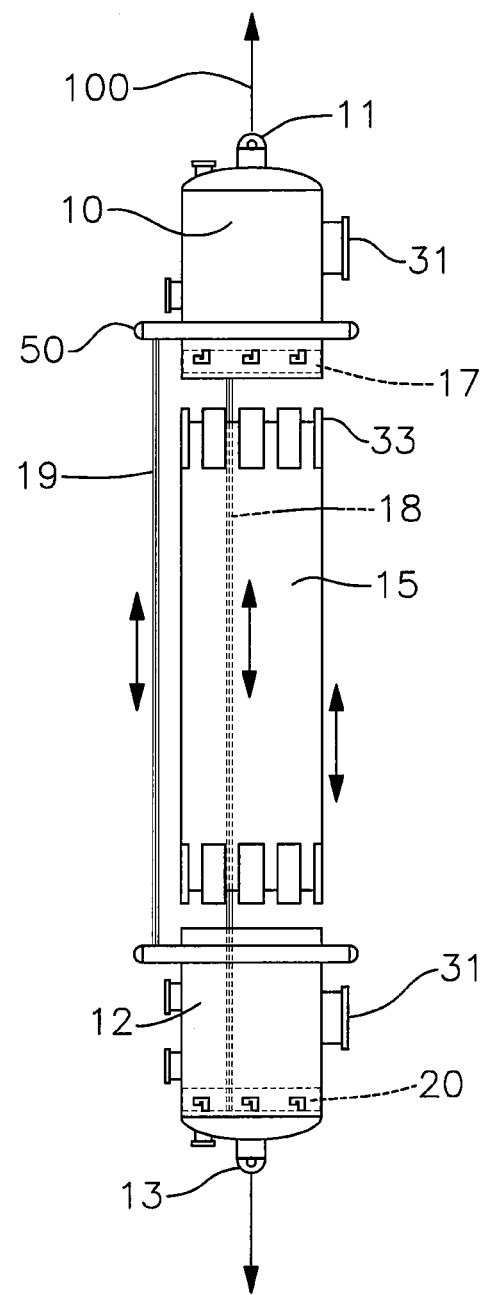
FIG. 2 shows an elevation view of an exemplary, partially disassembled suspended mass transfer tower.

Referring to FIGS. 1 and 2, the system generally comprises a top head 10 and a bottom head 12 connected by a soft shell 15 containing a suspended packing bundle 16, wherein the entire system is suspended by a means for suspension 11 located on the top head 10. In various embodiments described below, the system can further comprise upper tension hubs 17, lower tension hubs 20, internal suspension lines 18, and external suspension lines 19. Collectively, the top head 10, bottom head 12, the suspended packing 16 and shell 15 connect to form a suspended tower, as described below.

Referring to FIGS. 3-8, the top head 10 and bottom head 12 are an integral part of the mechanical support of the tower. They provide structural support for the shell 15, suspended packing 16, upper tension hubs 17, lower tension hubs 20, internal suspension lines 18, and external suspension lines 19 and miscellaneous tower components. The top head 10 supports the weight of the entire system, which is suspended from the suspension means 11. The bottom head 12 can be anchored via anchoring means 13 to the floor, external structures or a ballast to provide added stability to the entire tower.

Figure 4:
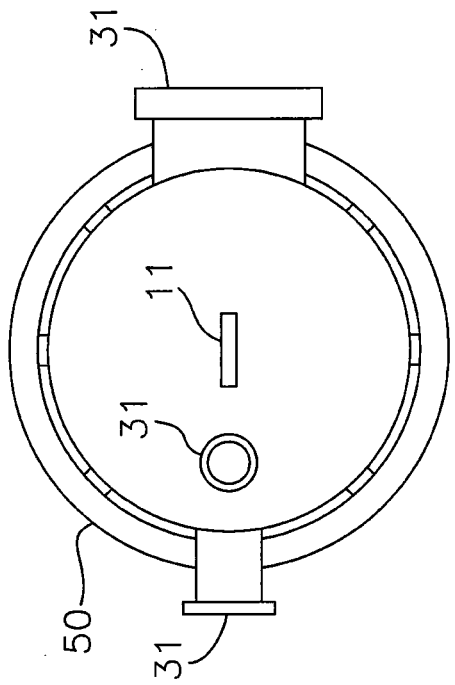
FIG. 4 is a top view of a typical top head.
Figure 5:
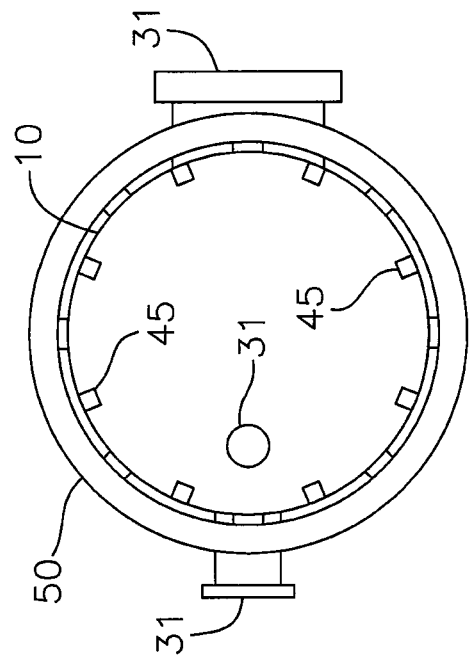
FIG. 5 is a bottom view of a typical top head.
Figure 3:
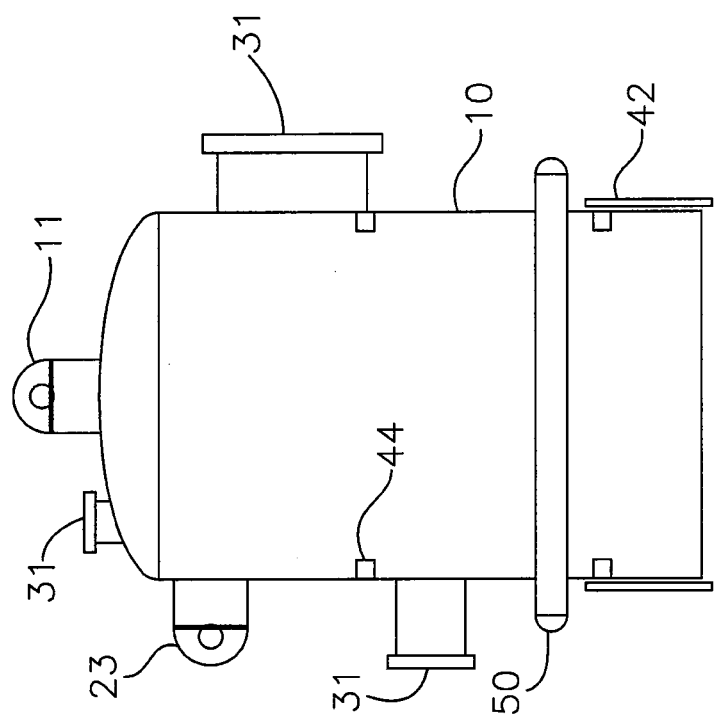
FIG. 3 is an elevation view of a typical top head.

The top head 10 has two main functions, which are first to provide a structure from which to suspend the tower, and second, to provide a place for the installation of internal tower components and provide connectivity to miscellaneous ancillary process equipment. Referring to FIGS. 3-5, the top head 10 is a rigid portion of the tower and is constructed of metal, plastic, composites, other rigid materials or a combination thereof. The top head 10 incorporates a means for suspension 11, such as lugs, hooks, clasps, anchors, or the like. The top head 10 has one or more suspension means 11 to apply the tension necessary to lift and suspend the entire tower system. The top head 10 can further comprise lateral lugs 23 that can be spaced laterally for bracing the top head 10, thereby reducing lateral or twisting movement. The top head 10 is laterally braced by attaching the lateral lugs 23 using lateral braces (not shown), such as rods or cables to a structure. The top head 10 provides a location 44 for the installation internal tower components such as liquid distribution, liquid distributors trays, mist eliminators, packing bed limiters, instrumentation and the like. The top head 10 also affords the installation of process nozzles 31 for the installation of internal tower components or to provide connectivity to ancillary process equipment 206. The remaining design of the top head 10 will vary depending of the demands of the process for which the system is designed.

Figure 7:
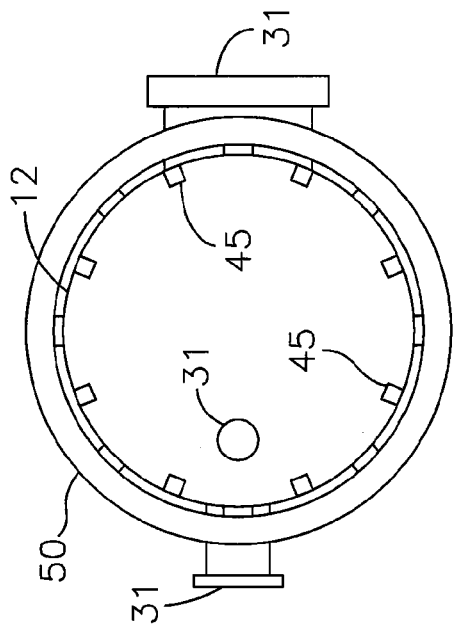
FIG. 7 is a top view of a typical bottom head.
Figure 8:
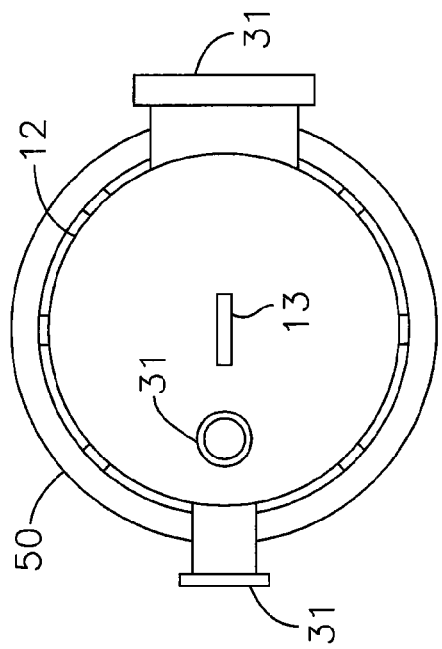
FIG. 8 is a bottom view of a typical bottom head.
Figure 6:
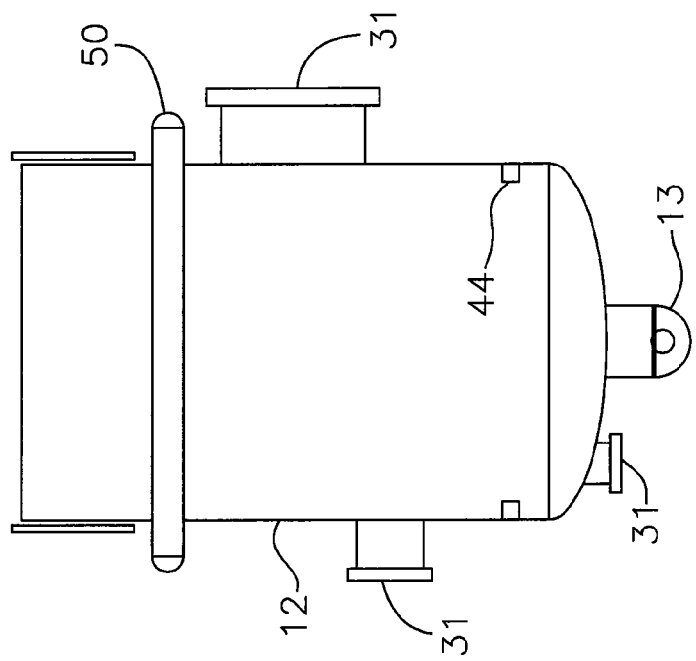
FIG. 6 is an elevation view of a typical bottom head.
Figure 12:
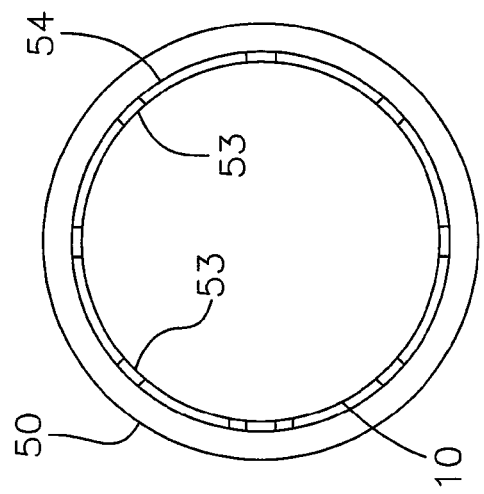
FIG. 12 is a top view of one embodiment of a top head having the support means shown in FIGS. 11 and 11A.
Figure 11A:
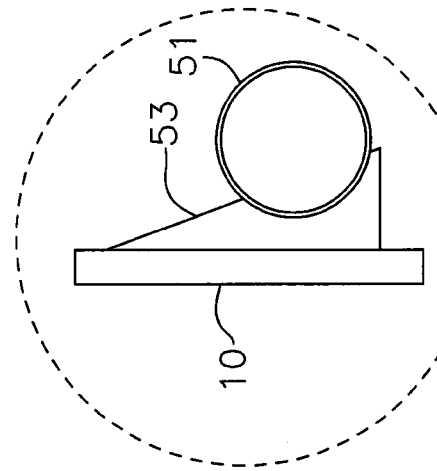
FIG. 11A is a cross section view of one embodiment of a shell support means on a top head.
Figure 11:
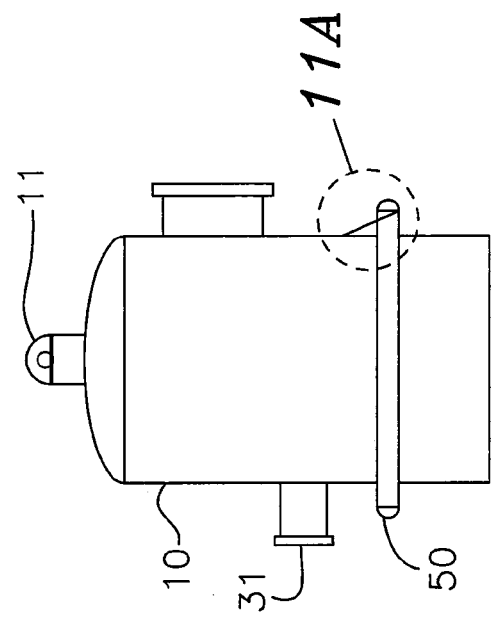
FIG. 11 is an elevation view of a typical top head showing one example of means of shell support.

The bottom head 12 has two main functions, which are first to provide a structure to anchor the suspended tower and second, to provide a place for the installation of internal tower components and provide connectivity to miscellaneous ancillary process equipment. As shown in FIGS. 6-8, the bottom head 12 is a rigid portion of the tower constructed of metal, plastic, composites, other rigid materials or a combination thereof. The bottom head 12 has one or more anchoring means 13 to apply the tension necessary to shape the shell 15 or anchor the suspended tower. The bottom head 12 can further comprise lateral lugs 23 that can be spaced laterally for bracing the bottom head 12, thereby reducing lateral or twisting movement. The bottom head 12 is laterally braced by attaching the lateral lugs 23 using lateral braces (not shown), such as rods or cables to a structure. The anchoring lug 13 or lateral braces 23 can also be attached to ballasts. The bottom head 12 affords a location 44 for the installation of different internal tower components such as the lower tension hub 20, liquid chute 25, spray nozzles, gas distributors, packing support trays and the like. The bottom head 12 also affords the installation of process nozzles 31 for the installation of internal tower components or to provide connectivity to ancillary process equipment 206. The bottom head 12 comprises a receptacle to collect the liquid falling down the tower's liquid management system.

As shown in FIG. 9, the upper tension hub 17 and lower tension hub 20 fit inside the top head 10 and bottom head 12, respectively. The tension hubs 17, 20 are designed to provide a location for retaining and anchoring the suspended packing 16 and internal suspension lines 18. In one embodiment, the tension hubs 17, 20 are annular rigid rings having slots 40 capable of mating with tension hub lugs 45 located on the inside surface of the top head 10 and bottom head 12, respectively. The lugs 45 can be welded or otherwise firmly attached to the interior of the heads 10, 12. The tension hubs 17, 20 are attached by inserting the hub into the respective head, aligning the slots 40 of the tension hubs 17, 20 with the tension hub lugs 45, and twisting the tension hubs 17, 20 such that the lugs 45 are securely and removably seated within the slots 40. Alternatively, the tension hubs 17, 20 can be bolted or welded in place. Several other embodiments of the tension hubs can be used. For example, the tension hubs could comprise bars forming a cross, grids, or racks, as desired.

Generally, the shell 15 is constructed of pliable or lightweight rigid materials allowing portability and ease of handling. The shell 15 serves the functions of joining the top head 10 and bottom head 12, containing the process gasses and liquids within the tower system, providing a space for the suspended packing 16, supporting the packing in certain applications, and providing the flow shape of the tower. Referring to FIG. 10, the shell 15 can be constructed of a combination of pliable materials such as polymer films, fabrics, rubber, membranes or a combination thereof. A single layer or multiple layers of similar or different materials can be used to fabricate the shell 15. One of the layers is typically of a stretch resistant material used for tensioning and shaping.

Other layer materials can be applied as lining for the shell 15 to provide chemical, erosion or fire resistance or for sealing purposes. Insulating layers can be used as required for the design. Multiple layers can be joined together by gluing, stitching, thermal fusing, vulcanizing or any other joining methods or combinations thereof. Supporting lines can be embedded within the layers of the shell 15 to provide additional tensile capacity. Access ports can be installed directly on the shell 15 to add or remove packing. In one embodiment, the top and bottom of the shell 15 comprise sealing cuffs 21 that snugly fits over the top 10 and bottom 12 heads to prevent process leaks.

The shell 15 can be detached from the top head 10 and bottom head 12 as described below. In embodiments where the shell 15 is constructed of pliable materials, when the shell 15 is detached from the heads 10, 12 and packing 16, it can be rolled, folded, or otherwise collapsed to promote easier handling and transportation. Depending on the size and configuration of the tower system, the collapsed shell 15 and the heads 10, 12 with the suspended packing 16 can be easily transported to nearly any location.

Figure 14A:
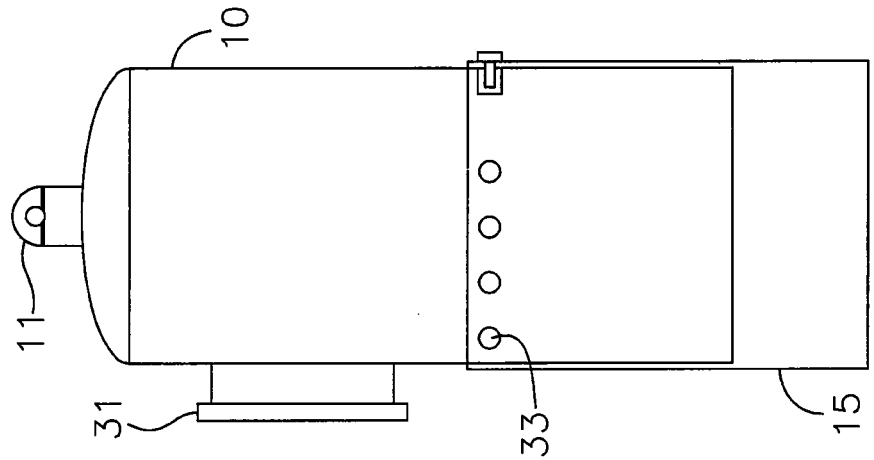
FIG. 14A is an elevation of the top head showing one embodiment of the top attachment means in which bolts are used to attach the shell to the heads.
Figure 14:
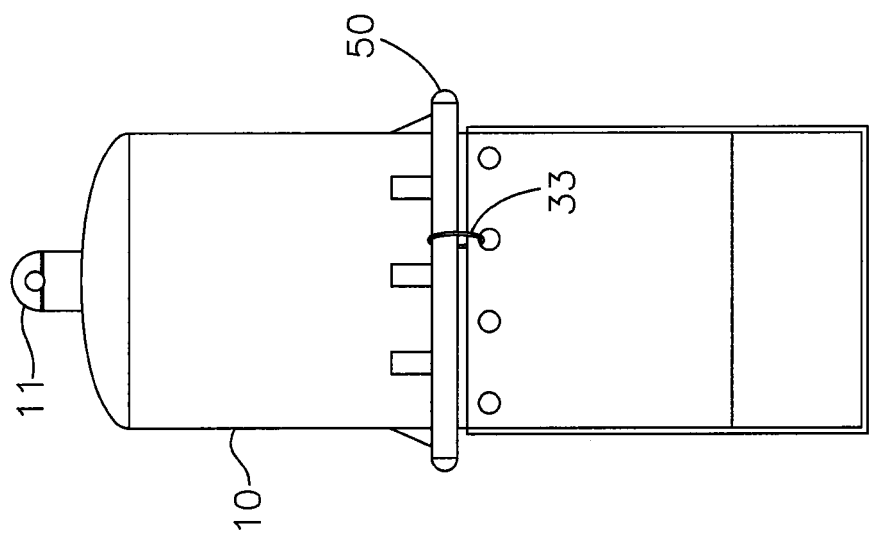
FIG. 14 is an elevation of the top head showing one embodiment of the top attachment means.
Figure 13:
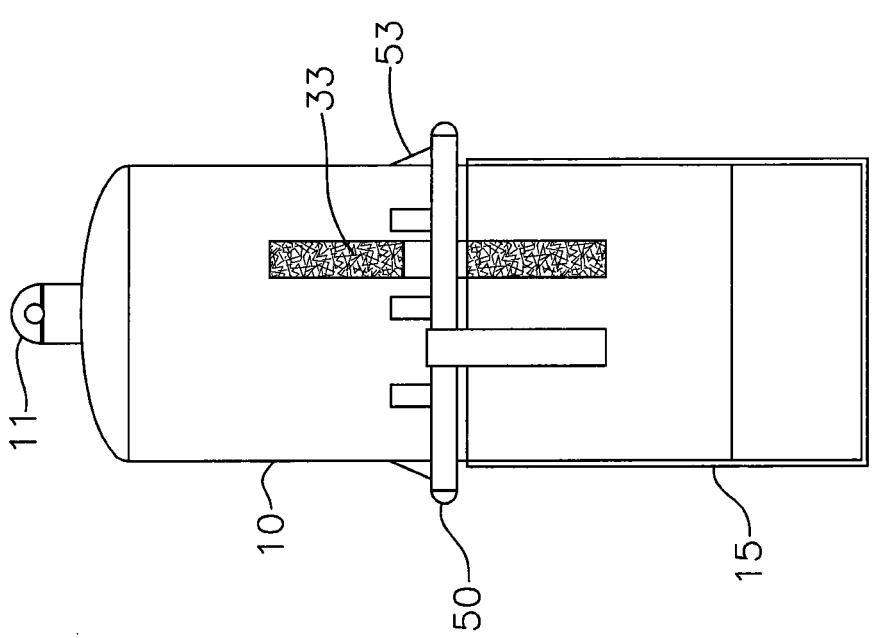
FIG. 13 is an elevation view of the top head showing one embodiment of the top shell attachment means.

The shell 15 has a means for a removable top attachment 33, which is any means for removably attaching the top of the shell 15 to the top head 10 or to a connection head 26 as described below. Referring to FIGS. 11-14, the top attachment means 33 can comprise a variety of attachment methods such as ties, hook-and-loop closures, buttons, hooks, bolts, or any other kind of releasably secured fastener. The heads 10, 12 comprise a means for shell support 50, such as hooks, rings, clasps, anchors, or the like. In one embodiment, the support means 50 comprises a ring 51 supported by wedge-shaped gussets 53 attached to the outer surface of the top head 10 or bottom head 12, where the attachment could be made by a weld, chemical bond or other. The ring 51 is seated over the gussets 53 such that the tension pull created by the shell 15 forces the ring 51 and gussets 53 to support the weight. The gussets 53 are radially spaced about the circumference of the heads 10, 12, which allows radial gaps 54 for securement of the attachment means 33, 34. In this embodiment, the attachment means 33, 34 could be straps secured with hook-and-loop closures, hooks, straps, fastener rings, or the like. In another embodiment attachment means 33, 34, shown in FIG. 14A, bolts are used to attach the shell 15 to the heads 10, 12 without using a ring structure 51.

The shell 15 comprises a means for a removable bottom attachment 34, which is any means for removably attaching the bottom of the shell 15 to the bottom head 12 or to a connector head 26 as described below. The bottom attachment means 34 can comprise a variety of attachment structures such as ties, hook-and-loop closures, buttons, hooks, bolts, or any kind of releasably secured fastener similar to those used for the top attachment means 33.

Figure 15:
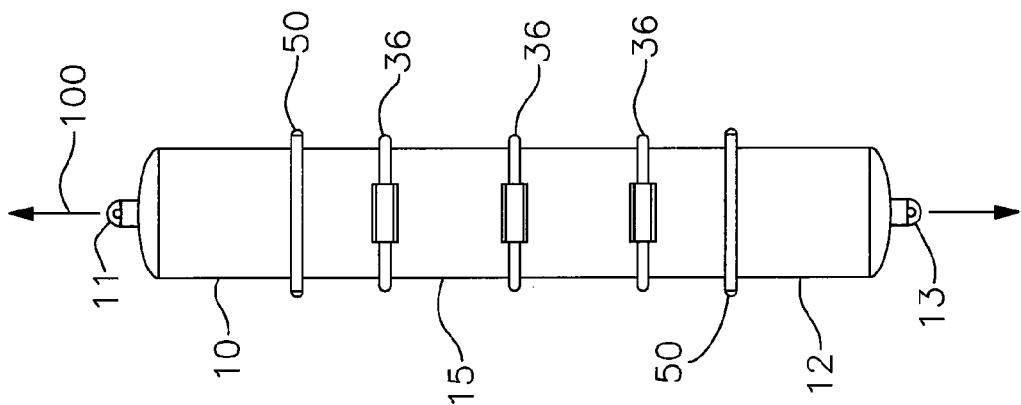
FIG. 15 is an elevation view of the suspended mass transfer tower system having one embodiment of the battens.
Figure 16:
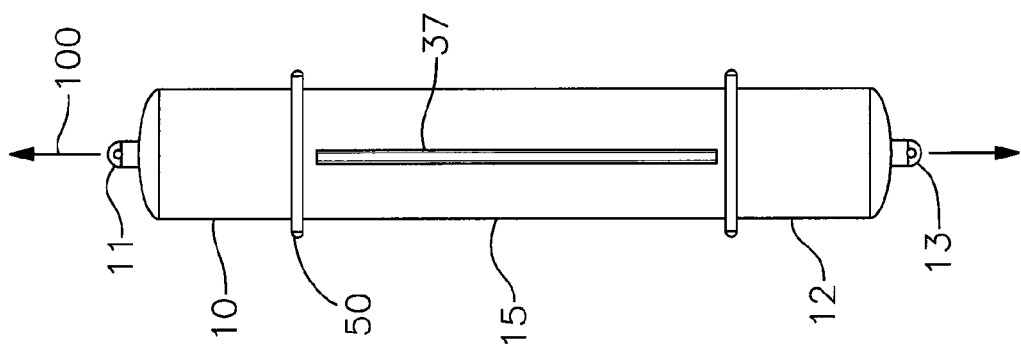
FIG. 16 is an elevation view of the suspended mass transfer tower system having one embodiment of the battens.
Figure 17:
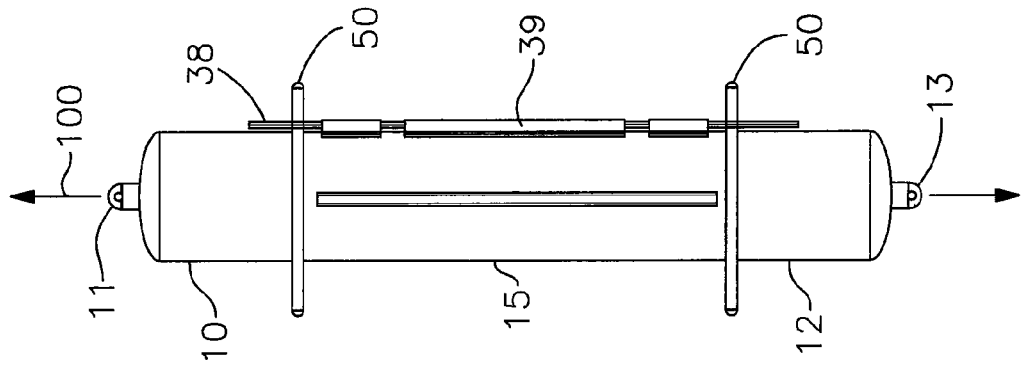
FIG. 17 is an elevation view of the suspended mass transfer tower system having one embodiment of the battens.

FIGS. 15-17 show several embodiments for the shape of the shell 15. The shape is maintained by stretching the shell 15 between the top head 10 and bottom head 12. Under normal conditions, the shell 15 is under tension induced by the weight of the bottom head 12, and the shell 15 conforms to its natural catenary shape. In many embodiments, the weight of the bottom head 12 and its contents can provide the tensile requirements for the system as described above.

In another embodiment, the shape of shell 15 can be enhanced by the use of battens 35 installed on the surface of the shell 15. The battens 35 can be adjusted as desired to alter the shape of the shell 15 for optimum performance of the process within the tower. For example, the battens 35 could be circular rings 36 placed around the exterior of the shell 15 to maintain the uniform circular section. These circular rings 36 can prevent collapse of the shell 15 where the mass transfer system is operated under a partial vacuum. In another embodiment, the battens 35 could be vertical vanes 37 providing lateral stiffness to the shell 15. In another embodiment, the battens 35 could comprise external suspension lines 19 running through sleeves 39 on the external portion of the shell 15.

Figure 18A:
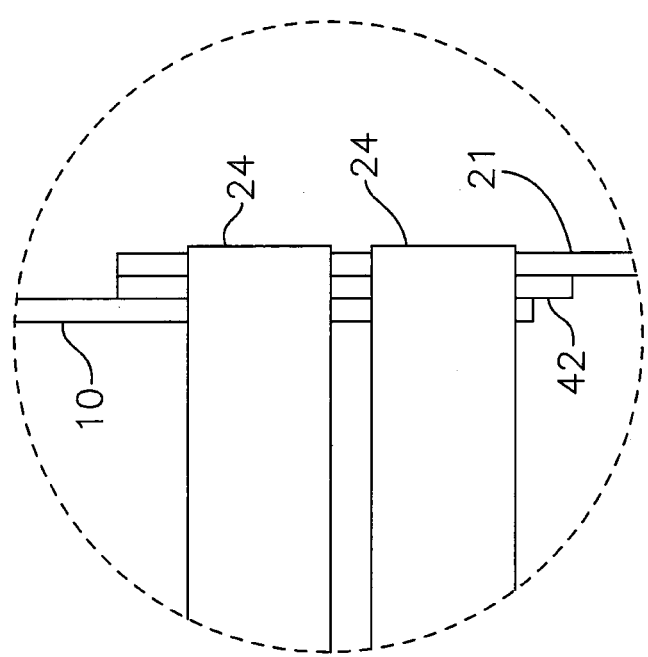
FIG. 18A is an enlarged view of a typical arrangement of a shell's sealing cuff, sealing gasket, top head and sealing bands.
Figure 18:
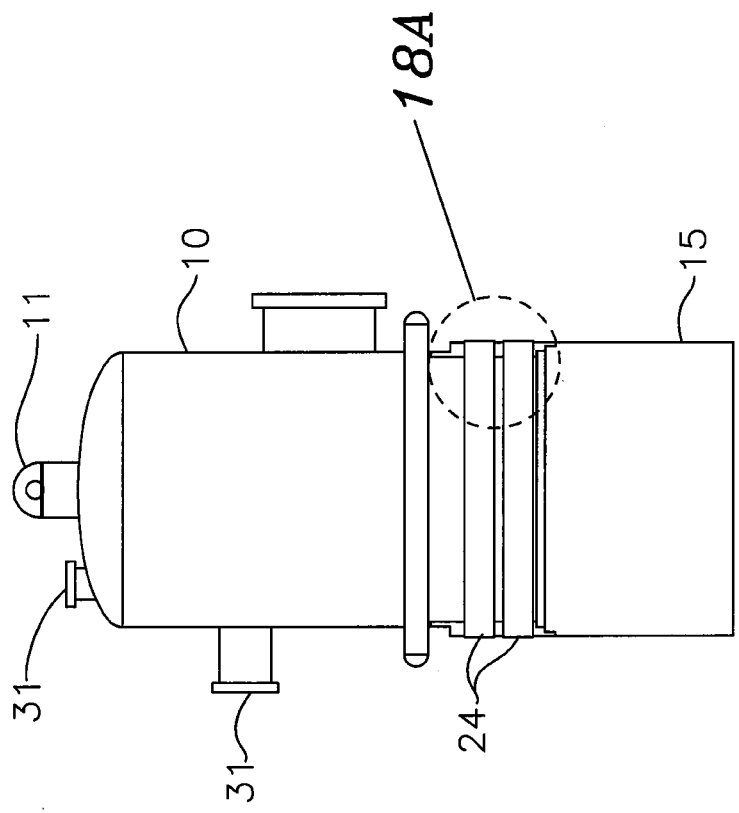
FIG. 18 is an elevation view of a typical top head showing the sealing bands securing the cuff of the shell.
Figure 20:
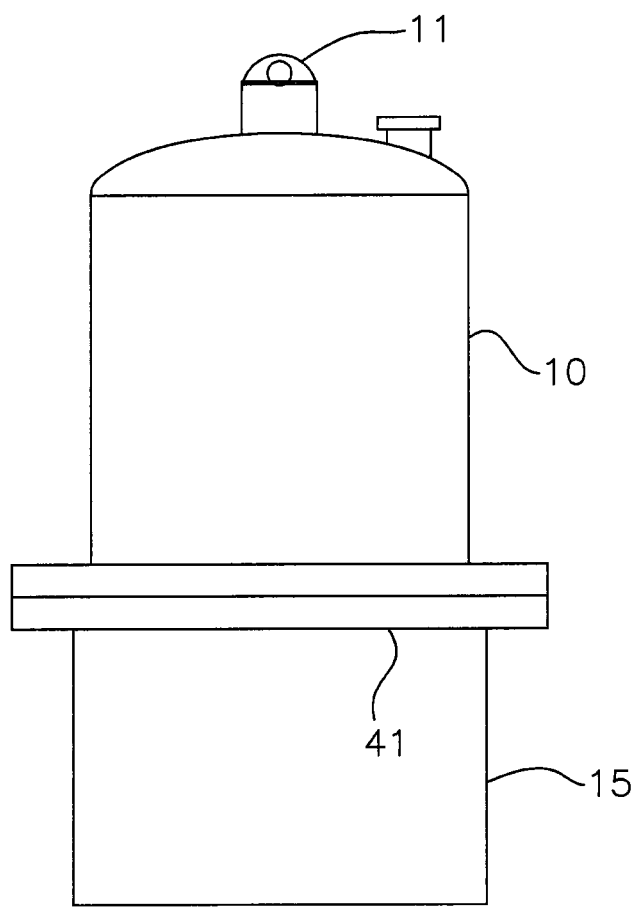
FIG. 20 is an elevation view of one embodiment of the top attachment means.

As shown in FIGS. 18-20, the top of the shell 15 comprises a sealing cuff area 21 forming a seal on the top head 10. The bottom of the shell 15 comprises a sealing cuff section area 21 forming a seal on the bottom head 12. The seals are formed by installing sealing bands 24 or other means of restraint on the cuff 21 section. The sealing bands 24 are tightened over the exterior of the top head 10 and bottom head 12, respectively, to seal in the process fluids.

In another embodiment, shown in FIG. 20, the top attachment means 33 and bottom attachment means 34 can comprise flanges 41 that mate to and foam a seal against a rims or flanges installed on top head 10 and bottom head 12, respectively. This seal can be formed by tightly bolting or otherwise securing the flanges 41 to the respective flange or rim in the top head 10 and bottom head 12. This type of seal is conventional in industrial applications.

Figure 21A:
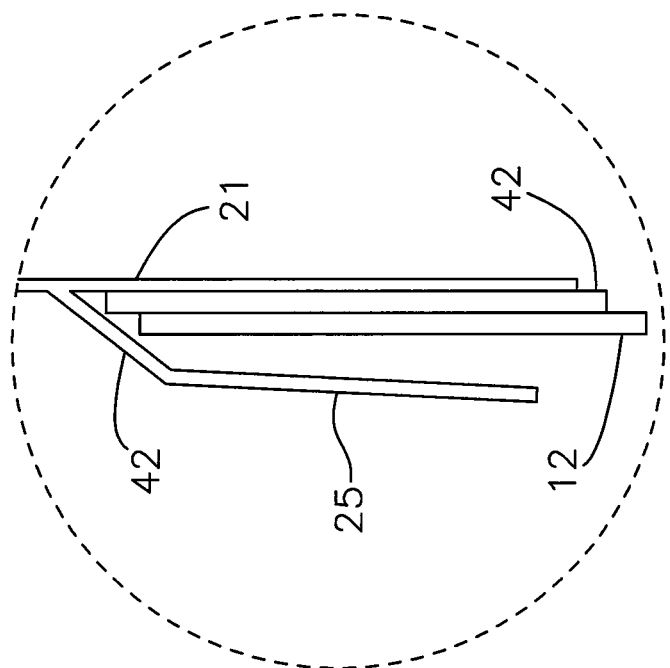
FIG. 21A is an enlarged view of the liquid chute, shell's sealing cuff, sealing gasket and bottom head.
Figure 21:
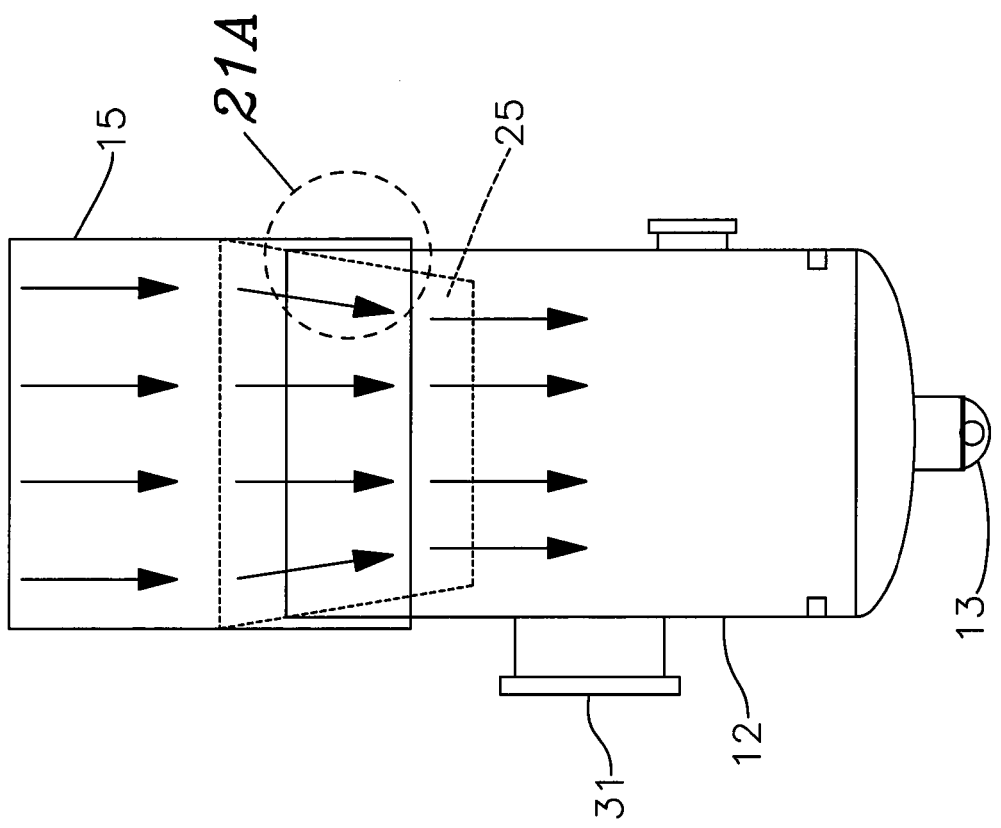
FIG. 21 is an elevation view of the bottom head showing the fluid flow from the shell to the bottom head through the liquid chute.

Referring to FIG. 21, in order to form a leak-resistant seal between the shell 15 and the bottom head 12, the shell 15 comprises a liquid chute 25, which is an annular, tapered flap-like portion near the bottom of the shell 15. The chute 25 directs the liquid flow away from the bottom seal created by sealing cuff 21 and the bottom head 12 and channels the liquid into the bottom head 12. The chute 25 can be inserted into the shell 15 or integral therewith. Optionally, a sealing gasket 42 can be placed between the cuffs 21 and the heads 10, 12. The sealing gasket 42 is any device or article capable of forming a seal between the upper or lower sealing cuff 21 and the top head 10 or bottom head 12. For example, the sealing gasket 42 could be an elastomer ring or band, rubber gasket, or the like. The liquid chute can be reinforced with battens 35 or braced to retain the integrity of its shape.

Figure 24:
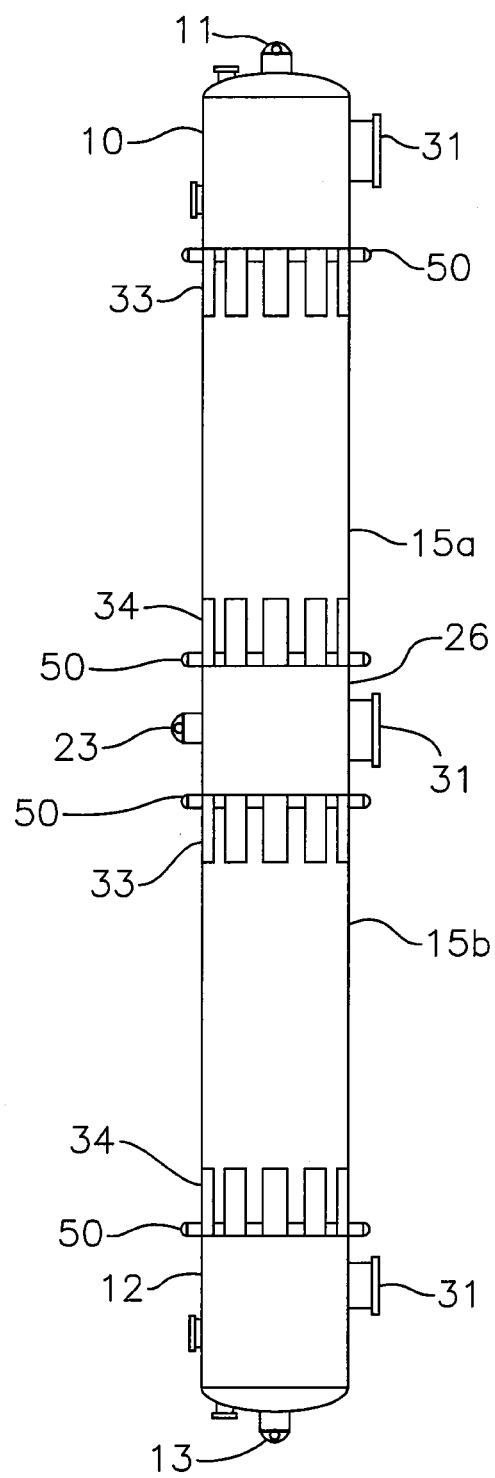
FIG. 24 is an exploded elevation view of a suspended tower system having multiple shell segments connected in series.

As shown in FIGS. 22-24, the shell 15 can be increased in length by connecting one or more shells 15 together using the suspension connector heads 26. The connector heads 26 comprise means for connecting to the shells 15 and provide a place for tower internals and equipment 31. The bracing of the shell 15 is similar to the top head 10 and bottom head 12. The connector heads 26 comprise one or more shell support means 50 such as described above in the context of the heads 10, 12. In the suspended tower having multiple shell 15 segments, a connector head 26 can be disposed between an upper shell segment 15a and a lower shell segment 15b. The upper segment 15a attaches to a support means 50 on the connector head 26 via the bottom support means 34 on the upper segment 15a. The lower segment 15b attaches to a support means 50 on the connector head 26 via the top attachment means 33 on the lower shell segment 15b. The attachments are made by similar methods and means as those described above in the context of attaching the shell 15 to the heads 10, 12.

Figure 25:
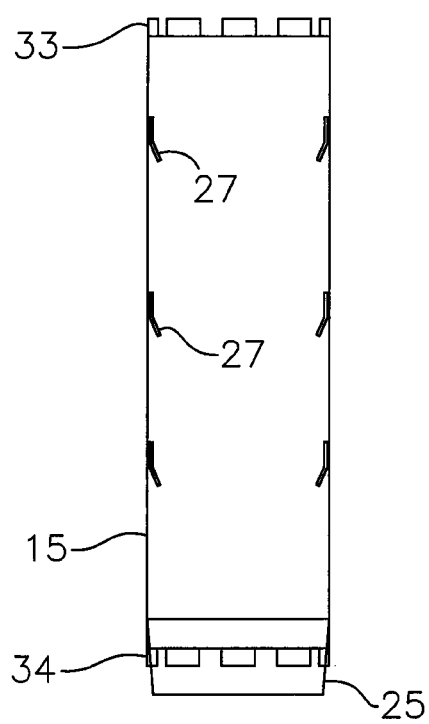
FIG. 25 is a cross section view of the shell, showing typical seal ridges.

As shown in FIG. 25, circular seal ridges 27 can be attached to the inside of the shell 15 to provide effective contact between the inner wall of the shell 15 and the suspended packing 16. The seal ridges 27 are annular or semi-annular flaps protruding towards the interior of the shell. As described below, the suspended packing 16 is supported or suspended inside the shell 15. The seal ridges 27 provide a means by which the liquid flowing down the inside of the shell 15 can contact the suspended packing 16 and gas rising inside the shell 15. Effective contact is required to enhance liquid-gas interaction and to reduce wall effect disturbances that can reduce the efficiency of the tower. The aforementioned contact also reduces the possibility of liquid channeling down the inside wall of the shell 15.

Depending on the particular application of the tower system, the shell 15, tension hubs 17, 20, and support lines 18, 19 provide redundant load paths to support the dead weight of the tower. In some embodiments of the system, the shell 15 is capable of providing sufficient tensile strength to support the weight of the system without additional tensile support from other members. In other embodiments, internal suspension lines 18 or external suspension lines 19 can share or support the entire tensile load. As shown in FIG. 2, the internal suspension lines 18 are cables or rigid rods that are used in the interior of the towers, which the exterior suspension lines 19 are disposed on the exterior of the tower. The suspension lines 18 are attached to the tension hubs 17, 20 in the top head 10 and bottom head 12, respectively. The external suspension lines 19 are attached to 50 or other bracing points on the top head. The suspension lines 18, 19 can be used to provide lateral stiffness and tensile strength to the tower.

Figure 26:
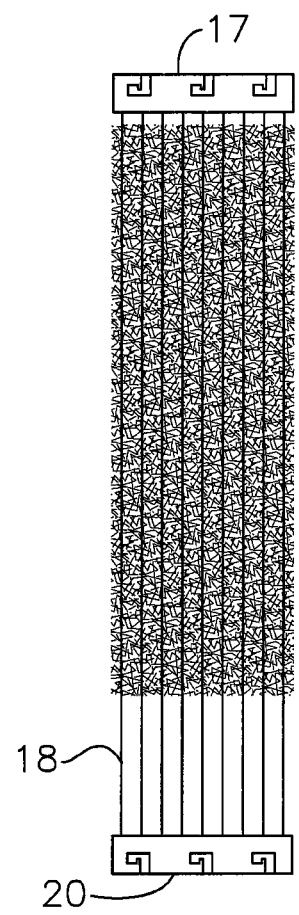
FIG. 26 is an elevation view of one embodiment of suspended packing suspended within the tower system.

The packing is suspended from the top head 10 via the upper tension hub, from the shell 15, or a combination of the thereof. The suspended packing 16 is used to provide a space for the intimate contact between the liquid and gas for process requirements. The suspended packing 16 in the interior of the tower can be installed by several methods. In one embodiment, the upper tension hub 17 comprises suspension bars 47 that serve as hangers for lines 18 supporting the suspended packing 16. The lines 18 could be cables, ropes, strings, straps, or any like material that can resist the tension and the chemicals in the system. As shown in FIG. 26, individual lines 18 can be threaded through the packing 16 material, which are suspended and anchored using the tension hubs 17, 20.

Figure 26A:
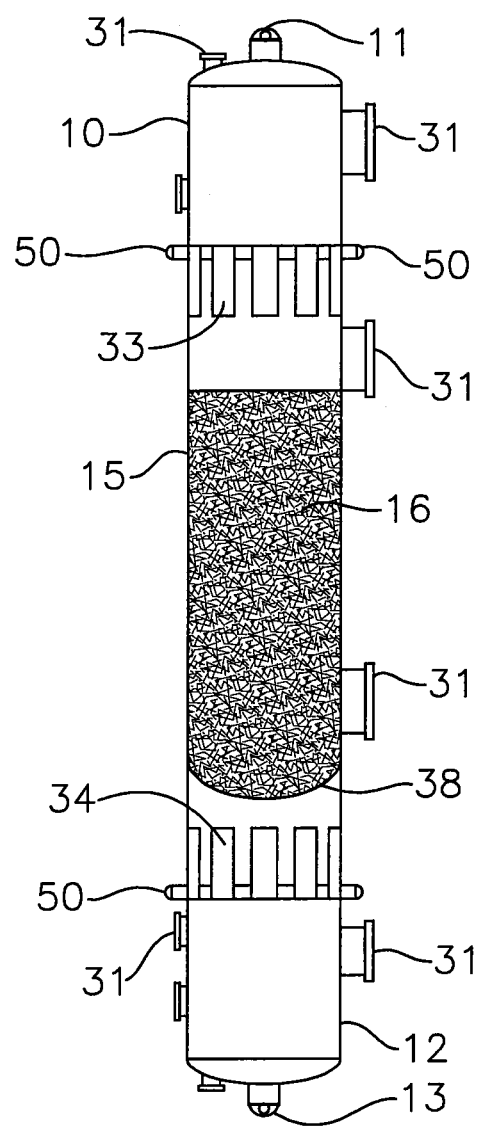
FIG. 26A is an elevation view of an alternate embodiment of suspended packing supported within the shell portion of the tower system.
Figure 28:
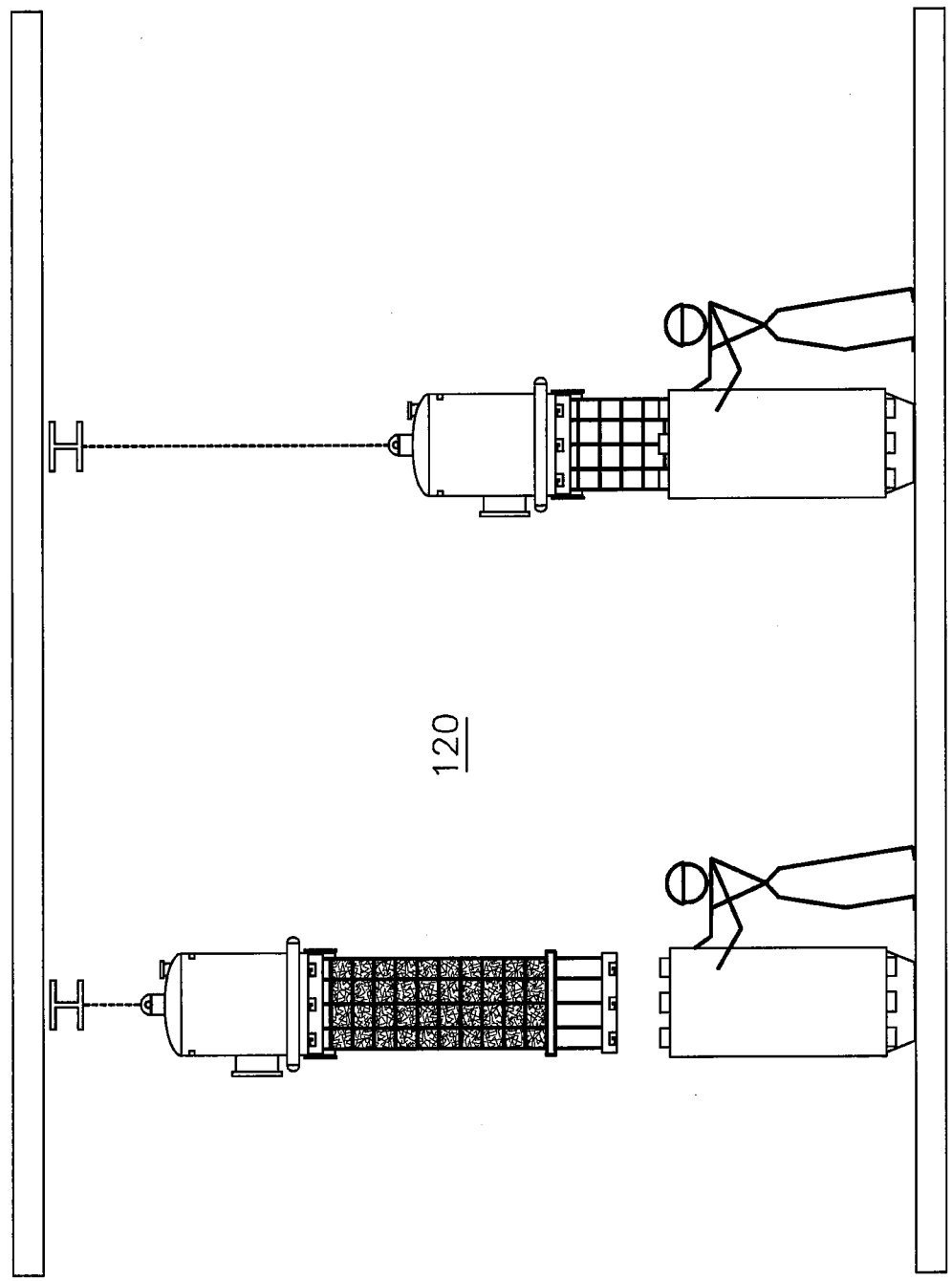
FIG. 28 is an elevation view of the step of preparing the shell for attachment to the top head.
Figure 29:
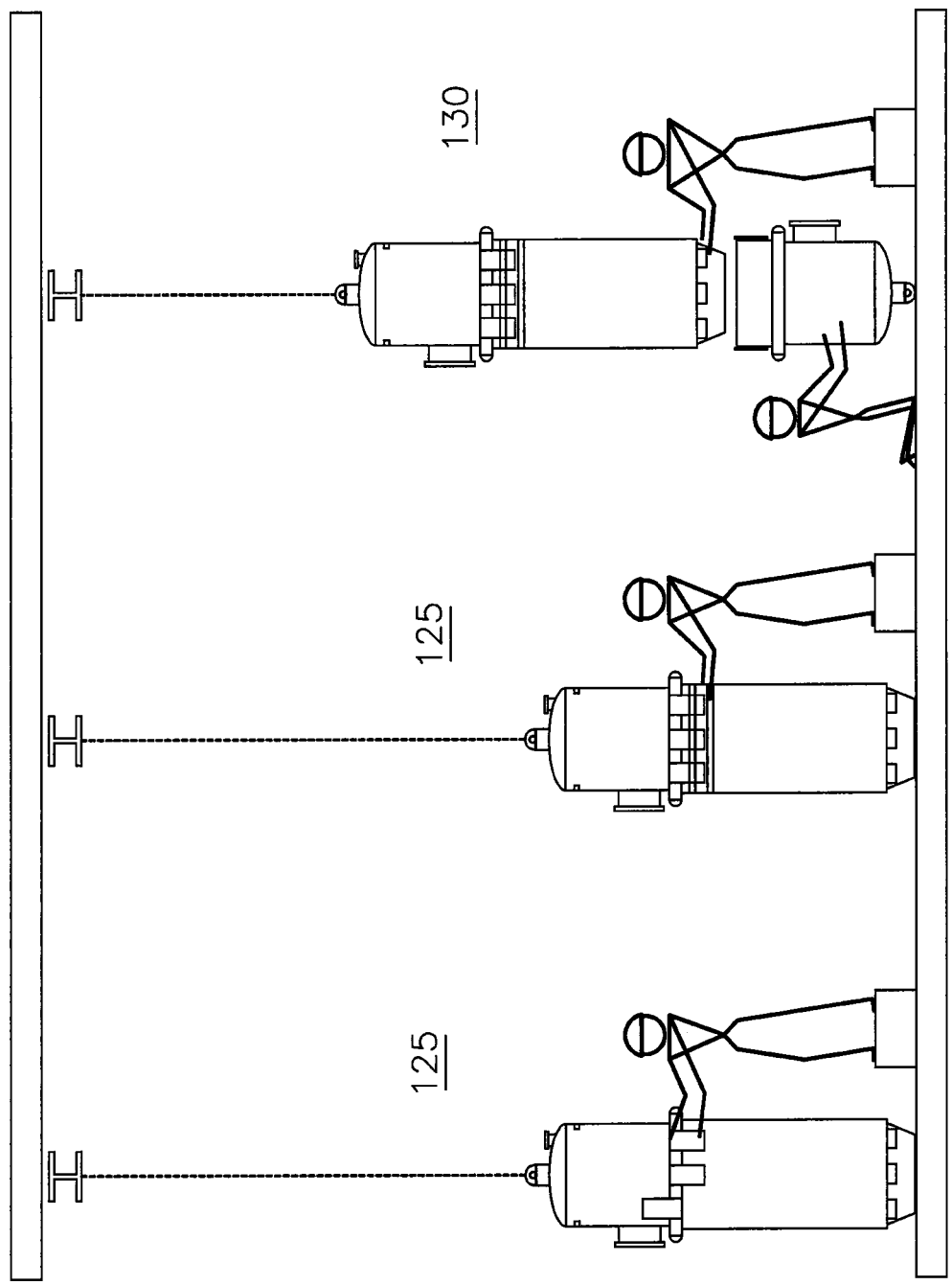
FIG. 29 is an elevation view of the steps of connecting the top head to the shell and preparing the bottom head for installation.
Figure 30:
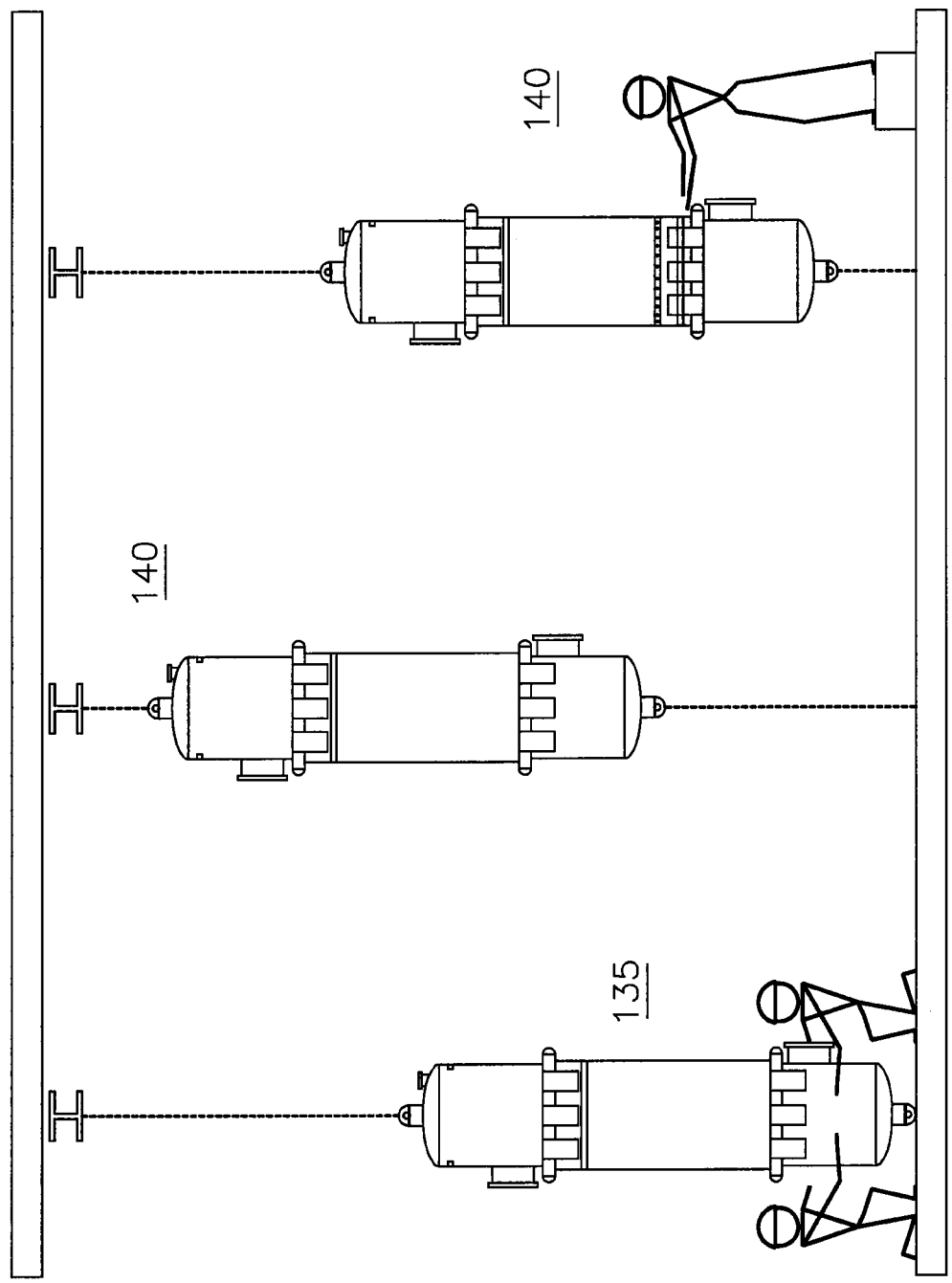
FIG. 30 is an elevation view of the steps of installing the bottom head securing the suspended tower.

The suspended packing 16 can be comprised of random or structured packing. In one embodiment, a packing bundle or cartridge is made by enclosing random packing in a membrane and suspended using lines 18. In other embodiments, structured packing can be aligned using suspension lines 18 and using a retainer base near the bottom of the tower system. FIG. 26A shows an embodiment where packing can be dumped inside the shell 15 which is fitted with a reticulated support 38. In this case, the shell 15 supports the packing in a bag like fashion. Otherwise, the tower can be operated as a spray tower with the internals supported on the shell or from the top head.

FIGS. 27-30 show a typical method of installing the system. The method comprises the steps of attaching the suspended packing to the top head 110, raising the top head and packing bundle 115, preparing the shell for attachment to the top head 120, connecting the top head to the shell 125, preparing the bottom head for installation 130, installing the bottom head 135, securing the suspended tower 140, and connecting the external equipment to the suspended tower 145.

In the step of attaching the suspended packing to the top head 110, the top head 10 is laid on its side while the packing bundle 16 is attached. The upper tension hub 17 is inserted into the top head 10 and twist-locked, bolted, or otherwise secured into place. As described above, the packing bundle 16 and suspension lines 18, 19 can be attached to the top head 10 as required for the particular application.

In the step of raising the top head and suspended packing 115, a suspension device 100 is attached to the suspension means 11, and the top head 10 and packing bundle 16 are lifted off of the ground surface to a height sufficient to provide the necessary ground clearance for preparing the shell 15 for attachment to the top head 10.

In the step of preparing the shell for attachment to the top head 120, the shell 15 is placed below and aligned with the elevated top head 10 and suspended packing 16. The top attachment means 33 is prepared for attachment to the top head 10, and the shell 15 is prepped for receiving any battens 35 or external suspension lines 19, as the situation requires.

In the step of connecting the top head to the shell 125, the suspended packing 16 and top head 10 are lowered into the shell 15. The top attachment means 33 is secured to the support means 50 on the top head 10 such that the shell 15 is securely and removably attached to the top head 10. All fasteners are secured and all sealing bands 24 are tightened.

In the step of preparing the bottom head for installation 130, the top head 10, suspended packing bundle 16, and shell 15 are lifted to provide adequate ground clearance to prepare the bottom head 12 for installation. The bottom head 12 is position below the shell 15 such that the shell 15 will align with the bottom head 12 when the shell 15 is lowered.

In the step of installing the bottom head 135, the top head 10, suspended packing 16, and shell 15 are lowered to connect with the bottom head 12. The bottom tension hub 20 is inserted into the bottom head 12 and twist-locked, bolted, or otherwise secured into place. The bottom attachment means 34 is connected to the support means 50 on the bottom head 12 such that the shell 15 is securely and removably attached to the bottom head 12. All fasteners are secured and all sealing bands 24 are tightened. As described above, the packing bundle 16 and suspension lines 17, 18, can be attached to the bottom head 12 as required for the particular application. As another optional embodiment in step 135, any suspension lines can be tensioned or stretched. Once the suspension lines have been tensioned, the bottom attachment 34 of shell 15 can be attached to bottom head 12 support means 50 and sealing bands 24 tightened.

In the step of securing the suspended tower 140, the top head 10, suspended packing bundle 16, shell 15, and bottom head 12 are lifted so that the entire tower system is elevated above the floor or ground. Optionally, one or more anchor lines 49 can be attached to the anchor means 13 on the bottom head 12, and lateral bracing lines (not shown) are attached to the lateral lugs 23 as desired.

Figure 31:
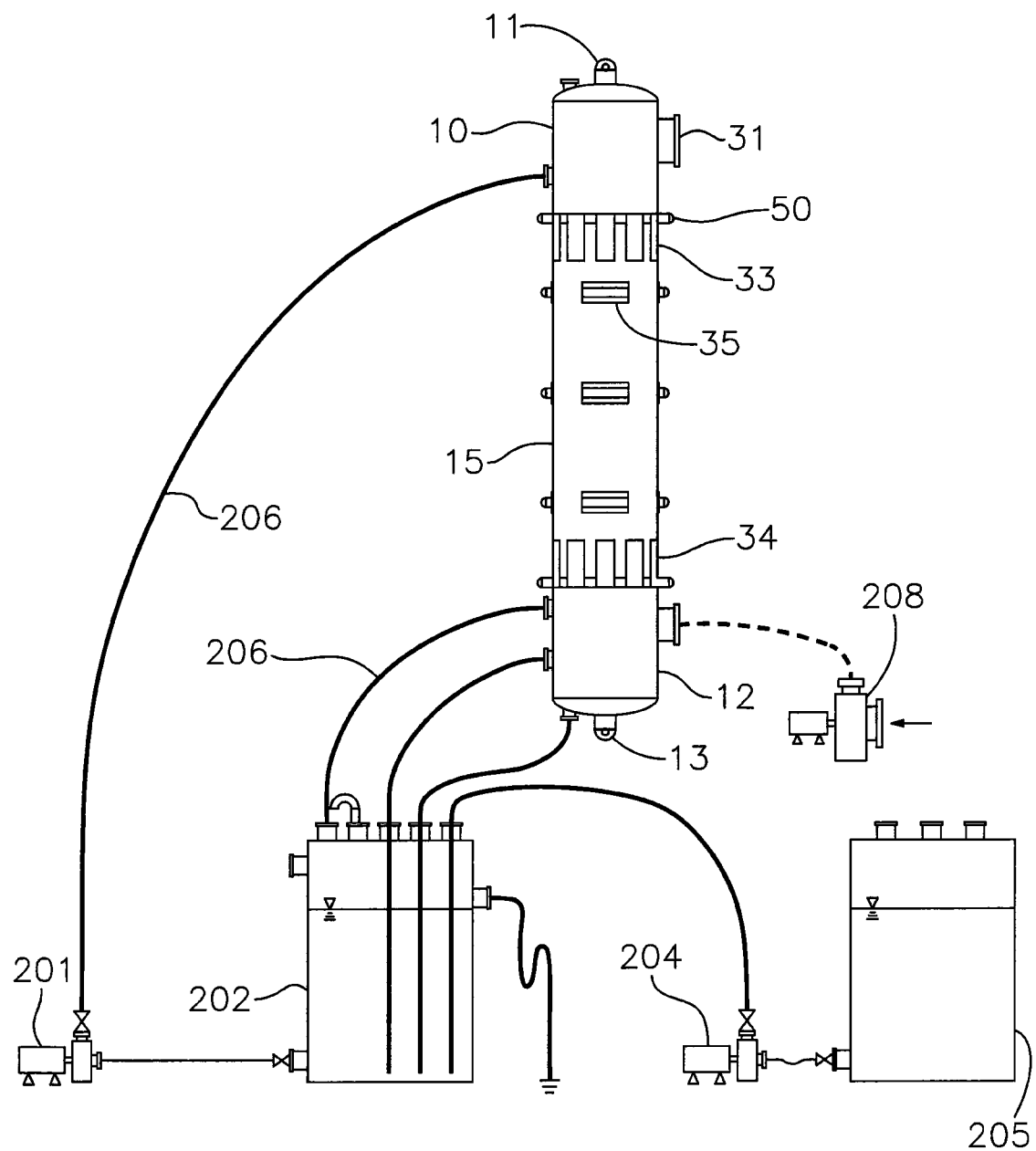
FIG. 31 shows an elevation view of one embodiment of the industrial connectivity of ancillary equipment used for a typical suspended mass transfer tower system.

In the step of connecting the external ancillary process equipment to the suspended tower 145, the external equipment is connected to the suspended tower system by any manner conventional in the industry. FIG. 31 shows that the tower installation configuration will vary depending on the service required. The external ancillary process equipment may include any combination of circulation pumps 201, circulation tanks 202, fans 208, dosing pumps 204, scrubbing chemical tanks 205, and a plurality of conventional hoses, lines, ducts and conduits 206.

The foregoing embodiments are merely representative of the suspended, mass transfer system and not meant for limitation of the invention. For example, one having ordinary skill in the art would understand that many components described herein can be customized for specific applications by an ordinary practitioner. Several components of the suspended tower may be altered depending on the chemical process being deployed. Consequently, it is understood that equivalents and substitutions for certain elements and components set forth above are part of the invention, and therefore the true scope and definition of the invention is to be as set forth in the following claims.

What is claimed is:

1. A suspended tower system capable of performing mass transfers or chemical reactions, said tower system comprising:

a top head having a means for suspension and a means for shell support;

a bottom head having a means for shell support; and a shell having a means for a removable top attachment capable of securely and removably attaching to the means for shell support on the top head, and a means for a removable bottom attachment capable of securely and removably attaching to the means for shell support on the bottom head, such that the top head, bottom head, and shell form a single tower system capable of being suspended from the means for suspension.

2. The tower system of claim 1, wherein the shell further comprises a pliable material capable of being folded when the shell is removed from the top head and bottom head.

3. The tower system of claim 2, further comprising a plurality of external suspension lines having a top end and a bottom end, each of which external suspension lines is capable of being attached at the top end to the exterior of the top head, and attached at the bottom end to the exterior of the bottom head.

4. The tower system of claim 2, wherein the top head comprises an upper tension hub, and the bottom head comprises a lower tension hub, said mass transfer tower system tension further comprising internal suspension lines having an upper end and a lower end, each of said internal suspension lines are attached at the upper end to the upper tension hub, and attached at the lower end to the lower tension hub.

5. The tower system of claim 2, wherein the shell further comprises a liquid chute capable of directing the liquid flow inside the tower into the bottom head.

6. The tower system of claim 5, wherein the means for a removable top attachment and means for a removable bottom attachment further comprise sealing bands.

7. The tower system of claim 5, wherein the shell further comprises seal ridges capable of promoting efficiency of the mass transfer process.

8. The tower system of claim 5, wherein the shell further comprises battens capable of altering the natural catenary shape of the shell.

9. The tower system of claim 1, wherein the shell further comprises a thin-walled light-weight rigid material.

10. The tower system of claim 4, further comprising suspended packing material suspended from the upper tension hub.

11. A suspended tower system capable of performing mass transfers or chemical reactions, said tower system comprising:

a top head having a means for suspension;

a connection head;

a bottom head; and a plurality of shells, each having a means for a removable top attachment and a means for a removable bottom attachment, at least one shell being a top shell capable of attaching to the top head via the means for a removable top attachment on the top shell and capable of attaching to the connection head via the means for a removable bottom attachment, at least one shell being a bottom shell capable of attaching to the and bottom head via the means for a removable bottom attachment and capable of attaching to the connection head via the means for a removable top attachment, such that the top head, connection head, bottom head, and plurality of shells form a single tower system capable of being suspended from the means for suspension.

12. The tower system of claim 11, wherein the plurality of shells further comprise a pliable material capable of being folded when the shell is removed from the top head and bottom head.

13. The tower system of claim 12, further comprising a plurality of external suspension lines having a top end and a bottom end, each of which external suspension lines is capable of being attached at the top end to the exterior of the top head, and attached at the bottom end to the exterior of the bottom head.

14. The tower system of claim 12, wherein the top head comprises an upper tension hub, and the bottom head comprises a lower tension hub, said mass transfer tower system tension further comprising internal suspension lines having an upper end and a lower end, each of said internal suspension lines are attached at the upper end to the upper tension hub, and attached at the lower end to the lower tension hub.

15. The tower system of claim 12, wherein at least one shell further comprises a liquid chute capable of directing the liquid flow inside the tower into the bottom head without seepage or spillage.

16. The tower system of claim 15, wherein the means for a removable top attachment and means for a removable bottom attachment further comprise sealing bands.

17. The tower system of claim 15, wherein the plurality of shells further comprise seal ridges capable of promoting efficiency of the mass transfer process.

18. The tower system of claim 15, wherein the plurality of shells further comprise battens capable of altering the natural catenary shape of the shell.

19. The tower system of claim 11, wherein the plurality of shells further comprise a thin-walled rigid material.

20. The tower system of claim 14, further comprising suspended packing material suspended from the upper tension hub.

* * * * *